United States Patent Office 3,455,475
Patented July 15, 1969

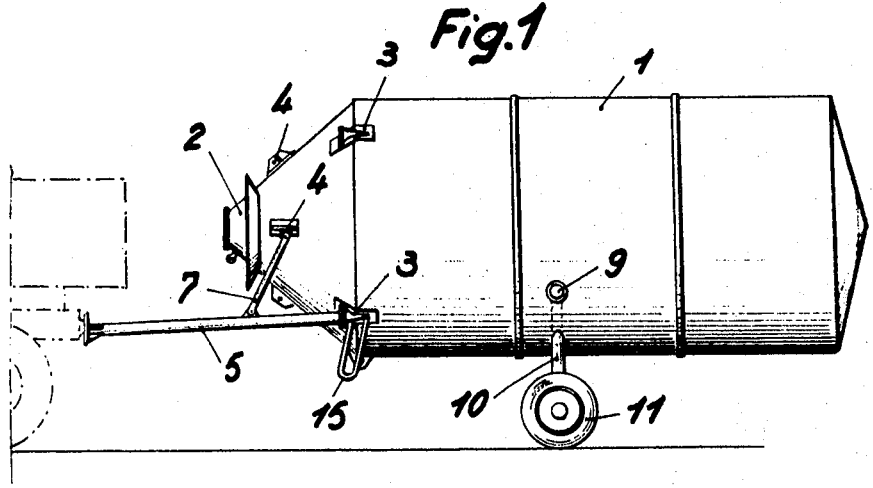
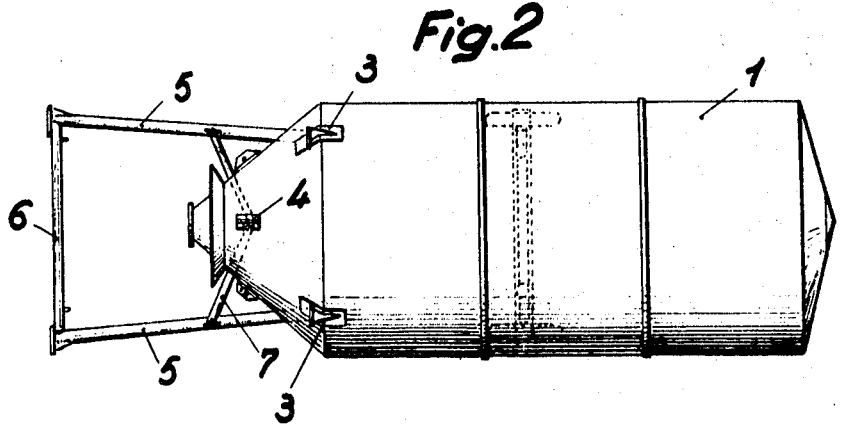
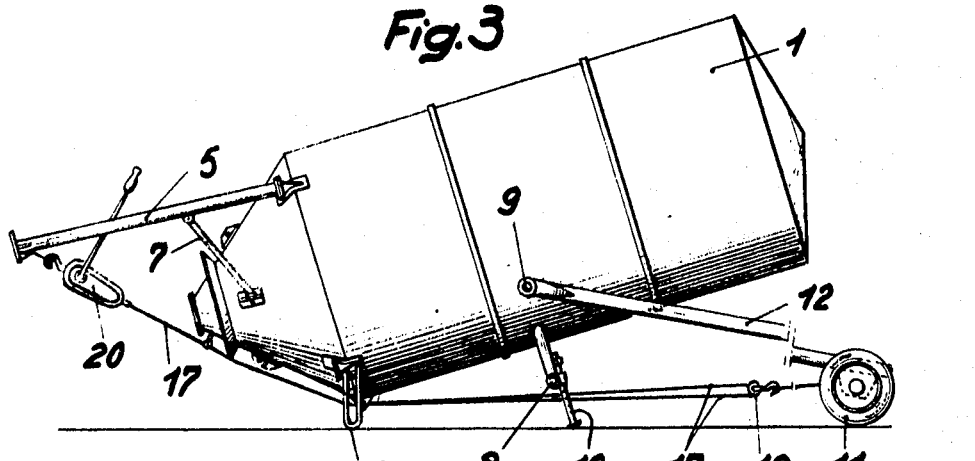

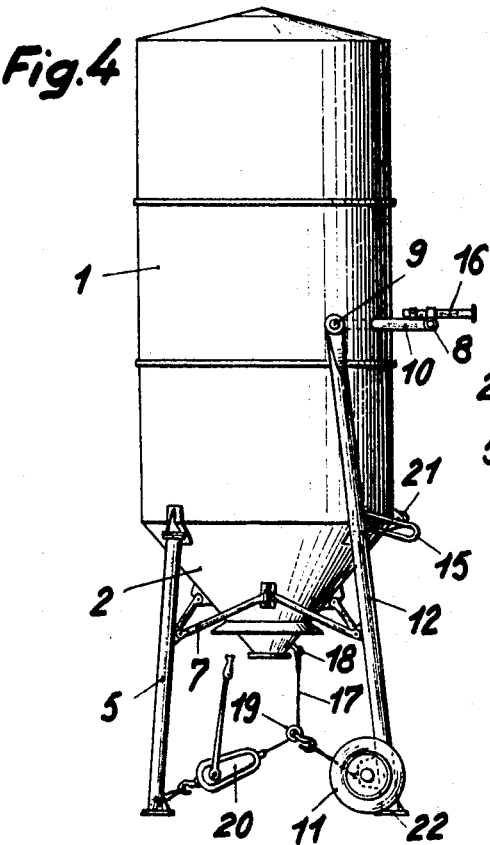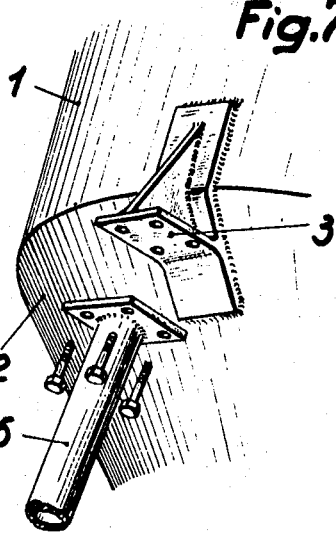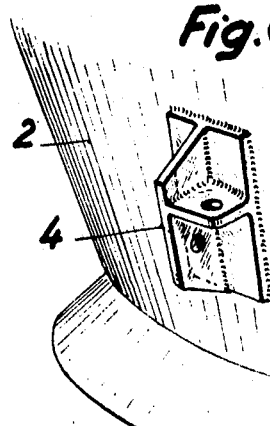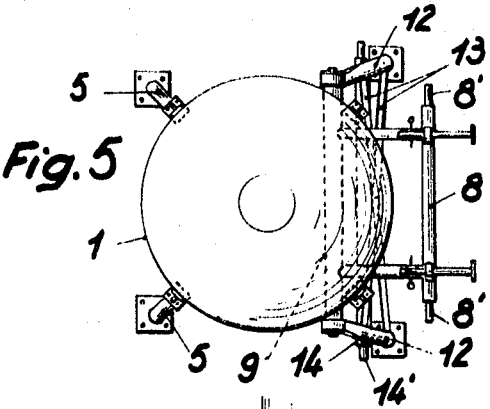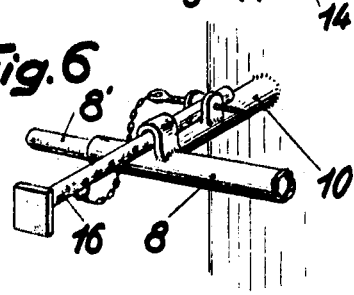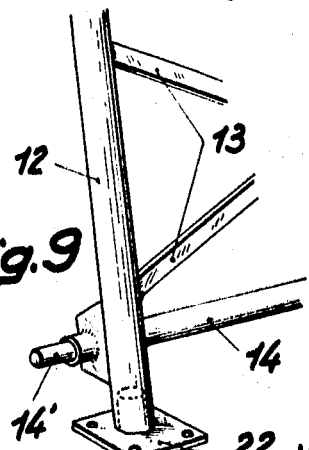

3,455,475
MOBILE SILO
Louis Rene Maxime Suteau, 6 Rue de Beny,
14 Caen, Calvados, France
Filed Dec. 27, 1967, Ser. No. 693,887
Claims priority, application France, Jan. 6, 1967,
90,216
Int. Cl. B66f 9/06; B60p 5/22
U.S. Cl. 214—500                              5 Claims

ABSTRACT OF THE DISCLOSURE

A silo, which is suitable for the storage of cement, which may be cylindrical, is provided near its base with fixing flanges suitably distributed for retaining supporting and adjusting legs, and also triangulation straps, and also two axles mounted about the middle of the long dimension of the silo, which axles are transverse and are reinforced in a parallel manner, the ends of the first one of these axles carry two wheels for the horizontal towing of the silo, while the ends of the second one of these axles permit the articulation of two legs for the adjustment and support of the silo assembly in vertical position.

The present invention relates to a mobile silo intended for example to contain cement, which is distinguished by the fact that it can be combined with various adaptable accessories, making it possible to transport it on a road, as in towing, and to raise it erect vertically for having it filled or emptied.

For this purpose, and according to a first embodiment, the silo presents on the one hand, towards its base, a number of holding flanges suitably distributed for the assembly of the fixed supporting legs or link supports, and on the other hand, about midway of its height, two transverse spindles, reinforced, the ends of the first one of which receiving two wheels for the horizontal transport of said silo, while the ends of the second one permit the articulation of two legs for support and adjusting of the assembly in vertical position.

When the silo has been brought near to the place for operation and has been detached from the towing vehicle, its forward end rests on the ground by means of two crutch members appropriately designed and by means of two adjustable props carried on the supporting spindle, these latter being brought into contact with the ground so that said wheels can be raised and removed mounted on the ends of the supporting legs, which after articulation on the second spindle, are resiliently pulled back toward the adjusting legs which have been beforehand demounted and attached at the opposite one of their said position of adjusting by means of a system of block and tackle or pulleys.

The present invention will be understood by the following description by reference to the accompanying drawings which are given simply as an indication and not as a limitation, wherein:

FIG. 1 shows in elevation a silo designed according to the present invention and in the process of being towed.

FIG. 2 is a top view thereof.

FIG. 3 is a view in elevation of the silo resting on the ground and ready for being elevated.

FIG. 4 shows the silo after it has been raised.

FIG. 5 is a top view of the silo as shown in FIG. 4.

FIGS. 6, 7, 8 and 9 are detailed partial perspective views showing respectively an adjusting prop, flanges or retaining members for fixing the supporting legs or adjusting legs, a flange for fixing strap triangulation members for said legs, and finally the lower end of one supporting leg.

Referring to the drawings in detail, and according to a first embodiment, the silo 1, which for example may be cylindrical, has on its bottom end a truncated part 2, usually inclined for discharge, and comprises several fixing flanges 3 and 4, suitably distributed about the lower periphery, and of which the first ones permit the assembly of legs 5 for support or adjustment connected by a cross-bar 6, while the second ones provide for the fixing of straps 7 for triangulating said legs.

The silo 1 is further provided near the mid-point of its height with two spindles 8 and 9 which may be transverse and parallel, reinforced at 10, and of which the first one can receive at each of its ends 8' a wheel 11 permitting the horizontal transportation of the assembly, while the second spindle provides for the articulation of two lateral legs 12 for support and adjustment of the silo in vertical position.

For this purpose, the ends of the mobile legs 12 are grooved at 13 and include a cross-bar 14 whose ends form pins 14' which can receive the wheels 11 which are mounted on the spindle 8 for the transportation of the assembly.

For this purpose, the lateral crutches 15 provided near the truncated part 2 of the silo and adjustable props 16, carried on the spindle 8, facilitate the transfer of the wheels 11 when the assembly has arrived at the place for operation.

To effect the transportation on a road of such a silo, the latter normally reposes on the ground by crutches 15, and its props 16 have a certain inclination, the wheels 11 are fitted on the spindle 8, and then one swings the assembly backward in order to fix the legs 5 and their straps 7 on the flanges 3 and 4 respectively situated on the side of said spindle, the assembly being then ready to be towed by the connection of the cross-bar 6 to the towing device of a truck C or other vehicle (FIG. 1).

When it is desired to raise the silo vertically one detaches the bar 6 and then one swings the assembly backward in order to disunite from the flanges 3 and 4, the legs 5 and the straps 7, which are then fixed on the corresponding flanges situated on the opposite side (FIG. 3), and then one swings the silo in the other direction in such manner that it rests on the ground by its crutches 15 and its wheels 11. At this moment one applies the legs 12 to the axle 9, and then one connects the cross-bars 6 and 14 of the legs 5 and 12 by a tackle system of which the traction cable 17 attached at 18 on a ring provided near the spout 2 passes over a pulley 19 and is then submitted to the application of force from a lever tackle 20, tending to bring together the legs 12 with reference to legs 5. During this operation, the cable is guided by a flange 21 mounted in a cap carried by the silo.

As soon as the wheels 11 have left the ground, one drops the props 16 and then one extends the traction cable 17, and then one withdraws the wheels 11 which are placed on the ends 14' of the cross-bar 14 of the articulated legs 12.

At this moment one again pulls on the tackle 20 in such manner that the assembly is progressively raised vertically, and as soon as this position has been reached, one fixes the legs 12 to the adjustable flanges 3 and 4, and one applies to their lower ends shoes 22, and then one withdraws the wheels 11 and the assembly of the system of tackle.

The possibilities of towing and of raising a silo so designed permit obtaining a substantial economy of labor at the time of the operation of erecting and of taking down, and furthermore, the avoidance of an expensive handling apparatus.

It will be understood that the present invention is not limited to the particular embodiments described and shown in the drawing, but on the contrary extends to all modifications of form, dimension and applications.

I claim:

1. A mobile silo comprising in combination an oblong container, two series of fixing flanges attached to the respective ends of said silo, one of said series of flanges being arranged for receiving the ends of two legs for supporting and adjusting in place, and the other one of said series of flanges being arranged for receiving the ends of straps connected by their free ends to said supporting legs for the purpose of constituting a triangular system, a cross-bar for connecting said pair of supporting legs, two parallel and transverse axles being positioned respectively inside and outside toward the middle of the length of said container, a wheel on each of the ends of said exterior axle, an articulated leg adapted for being attached to each one of the ends of said interior axle which extends beyond the periphery of said container, props for connecting said two articulated legs, and means for bringing together the respective ends of the supporting legs and the articulated legs for the purpose of raising the silo vertically.

2. A mobile silo according to claim 1, comprising further supporting crutches situated toward the end of the silo comprising flanges, and means situated at the level of said axles for raising said silo and then being supported on said crutches in order to be able to remove said wheels.

3. A mobile silo according to the claim 2 in which the free ends of the articulated legs comprise mounting means to fix thereon selectively as desired either a wheel or a shoe.

4. A mobile silo according to claim 3 wherein the raising of the silo to vertical position is effected by a tackle system comprising a traction cable which is attached to the silo near the fixing flanges, and connects the connecting bars of each one of said pairs of legs and is submitted to the pull of a lever tackle.

5. A mobile silo according to claim 4 wherein straps similar to connecting the supporting legs to the silo, are used to connect to the silo the articulated legs when the silo is raised vertically, said straps being fixed by one of their ends on said articulated legs and are fixed by their other end on one of the flanges of the series of flanges situated nearest the lower end of said silo.

References Cited

UNITED STATES PATENTS 3,029,958   4/1962   Ruby _____ 214—2
3,313,435   4/1967   Welk _____ 214—501

ALBERT J. MAKAY, Primary Examiner

U.S. Cl. X.R.

280—5